United States Patent
Li et al.

(10) Patent No.: US 9,213,770 B1
(45) Date of Patent: Dec. 15, 2015

(54) DE-BIASED ESTIMATED DUPLICATION RATE

(75) Inventors: Tianran Li, Seattle, WA (US); Deima T. Elnatour, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 422 days.

(21) Appl. No.: 13/585,381

(22) Filed: Aug. 14, 2012

(51) Int. Cl.
*G06F 17/00* (2006.01)
*G06F 17/30* (2006.01)

(52) U.S. Cl.
CPC .... *G06F 17/30867* (2013.01); *G06F 17/30705* (2013.01); *G06F 17/30997* (2013.01)

(58) Field of Classification Search
CPC ............... G06F 17/30867; G06F 17/30705; G06F 11/079; G06F 17/30663; G06F 2221/074; G06F 17/30997; G06F 17/2211; G06F 17/30616; G06F 17/30687; G06F 3/0236; G06F 3/0237; G06F 17/30371; G06F 17/3053; G06F 17/30011; G06F 17/30023
USPC ................... 707/664, 692, 699, 728, 999.101
See application file for complete search history.

(56) References Cited

U.S. PATENT DOCUMENTS

| | | | |
|---|---|---|---|
| 6,691,042 B2 * | 2/2004 | Weng et al. | 702/19 |
| 7,016,882 B2 * | 3/2006 | Afeyan et al. | 706/13 |
| 7,197,497 B2 * | 3/2007 | Cossock | 1/1 |
| 7,323,341 B1 * | 1/2008 | Jasper | 436/56 |
| 7,647,309 B1 * | 1/2010 | Bar | 707/713 |
| 7,904,462 B1 * | 3/2011 | Thirumalai et al. | 707/749 |
| 8,001,141 B1 * | 8/2011 | Bar | 707/769 |
| 8,352,299 B1 * | 1/2013 | Seshadri et al. | 705/7.11 |
| 8,451,168 B2 * | 5/2013 | Henkel et al. | 342/357.44 |
| 8,799,236 B1 * | 8/2014 | Azari et al. | 707/688 |
| 2003/0078736 A1 * | 4/2003 | Weng et al. | 702/19 |
| 2007/0282827 A1 * | 12/2007 | Levin | 707/5 |
| 2008/0033939 A1 * | 2/2008 | Khandelwal | 707/5 |
| 2008/0288509 A1 * | 11/2008 | Mysen et al. | 707/100 |
| 2009/0012971 A1 * | 1/2009 | Hunt et al. | 707/100 |
| 2009/0187546 A1 * | 7/2009 | Hamilton Whyte | 707/3 |
| 2010/0010985 A1 * | 1/2010 | Wong et al. | 707/5 |
| 2010/0063763 A1 * | 3/2010 | Rozelle | 702/92 |
| 2010/0138529 A1 * | 6/2010 | Duffield et al. | 709/224 |
| 2011/0107237 A1 * | 5/2011 | Takao et al. | 715/753 |
| 2011/0289421 A1 * | 11/2011 | Jordan et al. | 715/739 |
| 2011/0289452 A1 * | 11/2011 | Jordan et al. | 715/810 |
| 2012/0085829 A1 * | 4/2012 | Ziegler | 235/493 |
| 2012/0102040 A1 * | 4/2012 | Battle et al. | 707/741 |
| 2012/0233170 A1 * | 9/2012 | Musgrove et al. | 707/740 |
| 2012/0278761 A1 * | 11/2012 | John | 715/810 |
| 2012/0316986 A1 * | 12/2012 | Levy et al. | 705/26.7 |
| 2014/0046964 A1 * | 2/2014 | Takao et al. | 707/749 |
| 2014/0108427 A1 * | 4/2014 | Spiegel | 707/748 |

* cited by examiner

*Primary Examiner* — Mohammed R Uddin
(74) *Attorney, Agent, or Firm* — Lee & Hayes, PLLC

(57) ABSTRACT

A sample of product listings is selected from a product catalog. An audit process is performed to identify other product listings in the product catalog that are duplicates of product listings in the sample. The probability that the product listings would be included in a randomly selected sample of product listings is computed for each of the product listings in the sample and the duplicate product listings. A weight is assigned to each of the listings in the sample and the duplicate listings that is inversely proportional to the computed probability for each listing. The weights may then be utilized to compute a de-biased estimated duplication rate of product listings in the product catalog. The de-biased estimated duplication rate may be utilized to reduce an actual rate of duplication of product listings in the product database.

16 Claims, 9 Drawing Sheets

DE-BIASED ESTIMATED DUPLICATION RATE

BACKGROUND

A merchant may provide an online e-commerce marketplace for the purchase of a variety of products by customers. The products might include physical products that are shipped directly to customers and/or digital products that customers download from the e-commerce marketplace. Products may be made available for sale by a number of sellers, with multiple sellers offering the same product. The sellers may provide details regarding the products they have for sale to a merchant system. The product details are utilized to generate product listings for the products on the e-commerce marketplace.

The product details provided by a seller might include values for various attributes of a product, such as a unique identifier for the product, a title and description of the product, and the purchase price for the product. The product details may then be utilized to generate product listings in a product catalog. The product listings are made available through the online e-commerce marketplace for searching and browsing by customers wishing to purchase the corresponding products from the sellers.

For a variety of reasons, it is possible for multiple product listings to be created in a product catalog that correspond to the same product. Having multiple product listings for the same product can be confusing to consumers and negatively impact the customer experience provided by an e-commerce marketplace. Moreover, a large number of duplicate product listings for the same products can also cause prices on the e-commerce marketplace to be higher. Higher prices may discourage customers from visiting an e-commerce marketplace.

It is with respect to these and other considerations that the disclosure made herein is presented.

DETAILED DESCRIPTION

Figure 1:
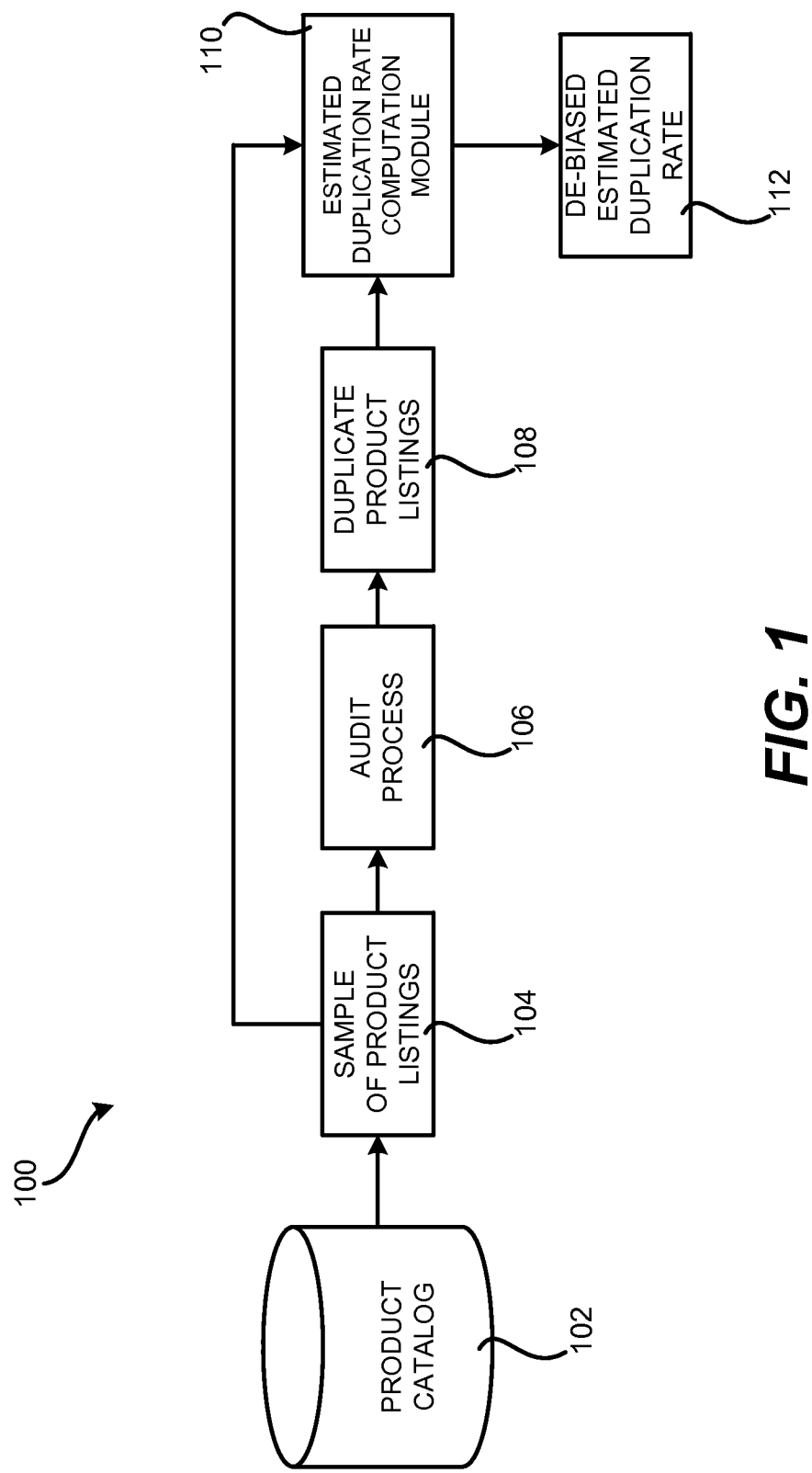
FIG. 1 is a software architecture diagram showing a mechanism for computing a de-biased estimated duplication rate according to one embodiment disclosed herein.

The following detailed description is directed to technologies for computing a de-biased estimated duplication rate. Through an implementation of the concepts and technologies disclosed herein, an estimate can be generated, referred to herein as an "estimated duplication rate", which describes the estimated rate of duplicate product listings in a product catalog. The estimated duplication rate may be "de-biased" to reduce or eliminate any bias introduced by an audit process for locating duplicate product listings in the product catalog. The de-biased estimated duplication rate may then be utilized in an attempt to reduce an actual rate of duplication of product listings in the product catalog. This may improve the customer experience and keep pricing competitive on an e-commerce marketplace that utilizes the product catalog.

According to aspects presented herein, a merchant system is disclosed that is configured to execute an online shopping module that provides an e-commerce marketplace, such as a World Wide Web ("Web") site, for online shopping. The online shopping module is also configured to maintain and utilize a product catalog that stores product listings for products available for purchase through the e-commerce marketplace. The e-commerce marketplace provides functionality for browsing and searching for pages corresponding to product listings in the product catalog, for purchasing the products, and for performing other functions.

According to embodiments, the merchant system is also configured to allow multiple sellers to sell products through the e-commerce marketplace. Sellers may provide product details to the merchant system that are utilized to generate product listings for the products offered for sale by the sellers. As mentioned above, the product details provided by a seller might include data for various attributes of a product, such as an identifier for a product; a title or description of the product; technical specifications for the product; the purchase price; data regarding product availability; shipping parameters and costs; the geographic region in which the product is available to customers; the locale of the seller's fulfillment center; and other types of product details. The product details may then be utilized to generate product listings for the products in the product catalog.

As mentioned above, it is possible for multiple product listings to be created in the product catalog that correspond to the same product. Having multiple product listings for the same product can be confusing to consumers and negatively impact the customer experience provided by an e-commerce marketplace. Moreover, a large number of duplicate product listings for the same products can also cause prices on the e-commerce marketplace to be higher. Higher prices may discourage customers from visiting an e-commerce marketplace.

Determining the actual rate of duplication of product listings in a product catalog having hundreds of millions of product listings may be very complex and computationally expensive. It may, however, be less computationally expensive to estimate the duplication rate of product listings in a product catalog or a subset of a product catalog, such as a category of products. In order to estimate the number of duplicate product listings in a product catalog, the embodiments disclosed herein present a mechanism for computing a de-biased estimated duplication rate. The de-biased estimated duplication rate describes the estimated number of duplicate product listings in a product catalog. The de-biased estimated duplication rate is also computed in a manner that reduces or eliminates bias introduced by an audit process for locating duplicate product listings in the product database.

In one embodiment, the de-biased estimated duplication rate is computed by first selecting a sample of product listings from a product catalog. The product listings might be selected, for instance, randomly from a particular category of products in the product catalog. In some embodiments, the population from which the sample is taken is restricted based upon one or more factors. For instance, the population might be restricted based upon whether product listings are visible or the number of search impressions the product listings have received. In this way, product listings that are not commonly viewed may not be factored into the estimated duplication rate. The population from which the sample is taken might also be restricted based upon other factors.

Once the sample of product listings has been taken, an audit process is performed to identify other related product listings in the product catalog, such as product listings that are duplicates of the product listings in the sample. For example, a search may be made within the product catalog for product listings that are duplicates of the product listings in the sample.

Once any duplicate product listings have been identified, a probability is computed for each of the product listings in the sample and the duplicate product listings. The computed probability is the probability that the product listings would be included in a randomly selected sample of product listings. The computed probability may be based upon the number of duplicate product listings found for each product listing. For instance, if no duplicate product listings are found for a product listing in the sample, its probability is computed as P, where P is a constant measuring the probability of sampling. If two duplicate product listings are found for a product listing in the sample, the probability for the three product listings is computed as 3P since the probability of selecting any of the three listings in a sample is three times greater than the probability of selecting a product listing that has no duplicates.

Once the probabilities are computed for each of the product listings in the sample and the duplicate product listings, a weight is assigned to each of the listings in the sample and the duplicate listings. In one embodiment, the assigned weight is inversely proportional to the computed probability for each listing. So, if a probability of 3P were computed for a particular product listing, a weight of $\frac{1}{3}$P would be assigned to the listing. If a probability of P were computed for a listing, a weight of 1/P would be assigned to the listing.

After the weights have been assigned, the weights may be utilized to compute the de-biased estimated duplication rate of product listings in the product category of the product catalog. The de-biased estimated duplication rate may be computed as a sum of the weights assigned to the duplicate product listings divided by a sum of the weights assigned to the product listings in the sample and the weights assigned to the duplicate product listings.

Once the de-biased estimated duplication rate has been computed, this value may be utilized to reduce an actual rate of duplication of product listings in the product database. For example, the computed de-biased estimated duplication rate may be utilized to modify a clustering process that merges product listings for the same product. The computed de-biased estimated duplication rate might also be utilized to modify the manner in which seller feeds containing product listings are processed. The computed de-biased estimated duplication rate might also be utilized in other ways in an attempt to reduce the actual rate of duplication of product listings within a product catalog. Additional details regarding these and other processes disclosed herein for computing a de-biased estimated duplication rate will be provided below with regard to FIGS. 2-9.

It should be appreciated that the embodiments disclosed herein might be utilized with any type of computer, computing system, device, Web site, application program, operating system, or other type of system or component. Accordingly, although the embodiments disclosed herein are primarily presented in the context of a merchant system that embodies the concepts disclosed herein for computing a de-biased estimated duplication rate for product listings, the disclosure presented herein is not limited to such an implementation. For example, while the embodiments disclosed herein are described primarily in the context of computing a de-biased estimated duplication rate for product listings in a product catalog, the mechanisms disclosed herein might be utilized to compute a de-biased estimated duplication rate for other types of items.

It should also be appreciated that the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several FIGS.

FIG. 1 is a software architecture diagram showing a mechanism 100 for computing a de-biased estimated duplication rate 112 according to one embodiment disclosed herein. As mentioned above, the de-biased estimated duplication rate 112 describes the estimated number of duplicate product listings in a product catalog 102 or a subset of the product catalog 102, such as within a product category. The de-biased estimated duplication rate 112 is also computed in a manner that reduces or eliminates bias introduced during audit process for locating duplicate product listings in the product catalog 102.

In order to compute the de-biased estimated duplication rate 112, a sample of product listings 104 is taken from a product catalog 102. The sample of product listings 104 might be selected randomly from the product catalog 102, for instance. Once the sample of product listings 104 has been generated, an audit process 106 is performed to identify other product listings in the product catalog 102 that are duplicates of product listings in the sample of product listings 104. For example, a manual or electronic search may be made within the product catalog 102 for duplicate product listings 108 of the product listings in the sample 104.

Once any duplicate product listings 108 have been identified, an estimated duplication rate computation module 110 is executed in order to compute the de-biased estimated duplication rate 112. As will be discussed in detail below, the estimated duplication rate computation module 110 is configured to compute an estimated duplication rate of product listings in the product catalog 102, or within some subset of product listings in the product catalog 102 such as a category of products. The estimated duplication rate computation module 110 is also configured to de-bias the estimated duplication rate 112 to reduce any bias introduced during identification of duplicate product listings 108 in the product catalog 102. The de-biased estimated duplication rate 112 may then be utilized in an attempt to reduce an actual rate of duplication of product listings in the product catalog 102. This may improve customer experience and keep pricing competitive on an e-commerce marketplace that utilizes the product catalog 102. Additional details regarding these processes, and others, for computing a de-biased estimated duplication rate 112 will be described below with regard to FIGS. 2-9.

Figure 2:
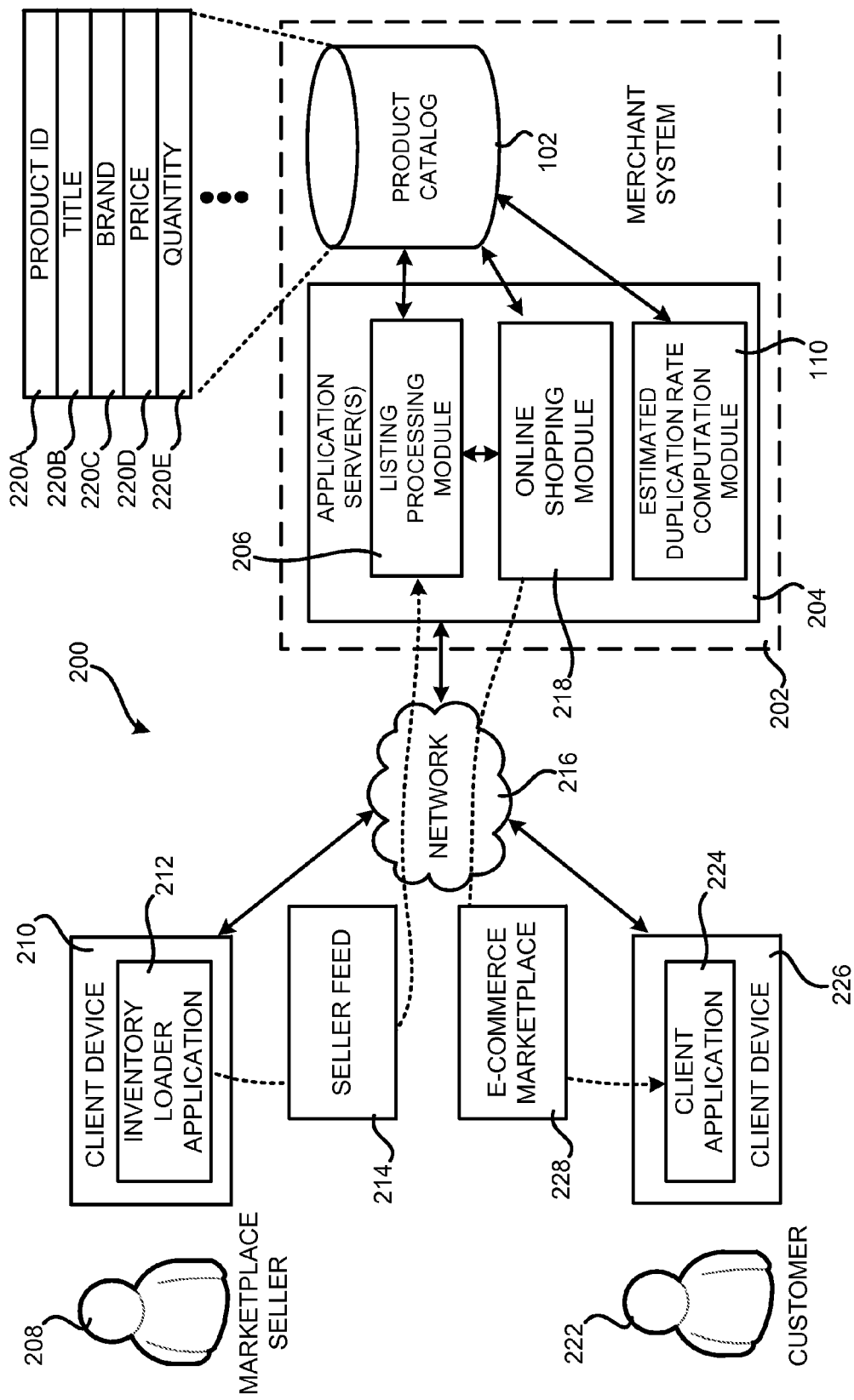
FIG. 2 is a computer and network architecture diagram showing aspects of one illustrative operating environment and several software components disclosed herein for computing a de-biased estimated duplication rate.

FIG. 2 and the following description are intended to provide a brief, general description of a suitable computing environment in which the embodiments described herein may be implemented. In particular, FIG. 2 is a system diagram that shows an illustrative operating environment 200 including several hardware and software components for computing a de-biased estimated duplication rate 112, according to embodiments provided herein. The environment 200 is merely illustrative and the embodiments disclosed herein might be utilized in many different types of environments.

The environment 200 shown in FIG. 2 includes a merchant system 202 that provides an e-commerce marketplace 228 through which customers may browse, search, and purchase products. In one embodiment, the merchant system 202 includes a number of application servers 204 that provide various application services to sellers, such as the seller 208, and customers engaged in commerce through the e-commerce marketplace 228, such as the customer 222.

The application servers 204 may be implemented as standard server computers, database servers, Web servers, network appliances, desktop computers, other computing devices, and/or any combination thereof. The application servers 204 may execute a number of modules in order to provide the various services described herein. The modules may execute on a single application server 204 or in parallel across multiple application servers 204 in the merchant system 202. In addition, each module may consist of a number of subcomponents executing on different application servers 204 or other computing devices in the merchant system 202. The modules may be implemented as software, hardware, or any combination of the two.

As shown in FIG. 2, a customer 222 may utilize a client device 226 to access the merchant system 202 through a network 216. The network 216 may be a local-area network ("LAN"), a wide-area network ("WAN"), the Internet, or any other networking topology known in the art that connects the client device 226 to the merchant system 202. Although only a single customer 222 has been illustrated in FIG. 2, it should be appreciated that many customers may simultaneously utilize the e-commerce marketplace 228.

The customer 222 may be an individual or entity that desires to browse, search, purchase, or has purchased, one or more products from the merchants that sell products via the e-commerce marketplace 228. The client device 226 may be a personal computer ("PC"), desktop workstation, laptop computer, tablet computer, notebook computer, personal digital assistant ("PDA"), electronic-book reader, game console, set-top box, consumer electronics device, server computer, or any other type of computing device capable of connecting to the network 216 and communicating with the merchant system 202. The customer 222 might also be referred to herein as a "user" or as a "visitor" to the e-commerce marketplace 228 provided by the merchant system 202.

The customer 222 may use a client application 224 executing on the client device 226 to access and utilize the online shopping services provided by the application servers 204. In one embodiment, the client application 224 is a Web browser application, such as the MOZILLA® FIREFOX® Web browser from MOZILLA FOUNDATION of Mountain View, Calif. The client application 224 exchanges data with the application servers 204 in the merchant system 202 using the hypertext transfer protocol ("HTTP") or another appropriate protocol over the network 216. The client application 224 might also be a stand-alone client application configured for communicating with the application servers 204. The client application 224 might also utilize any number of communication methods known in the art to communicate with the merchant system 202 and/or the application servers 204 across the network 216, including remote procedure calls, SOAP-based Web services, remote file access, proprietary client-server architectures, and the like.

According to one embodiment, the application servers 204 execute an online shopping module 218. The online shopping module 218 provides the e-commerce marketplace 228, including functionality for allowing the customer 222 to browse, search, and purchase products available from the online merchant that operates the merchant system 202 and from other sellers. For instance, the online shopping module 218 may retrieve a product listing for a particular product offered for sale by the online merchant or another seller from a product catalog 102, generate a Web page containing product information, and transmit the Web page over the network 216 to the client application 224 executing on the client device 226 for display to the customer 222.

The online shopping module 218 might utilize pre-stored or dynamically created resources to generate the e-commerce marketplace 228. For instance, Web pages, images, text files, program code for generating Web pages, metadata, scripts, executable code, and other types of data utilized to create and/or provide a Web page might be stored or dynamically generated. Other types of resources might also be stored or generated dynamically by the online shopping module 218 to provide the e-commerce marketplace 228. The online shopping module 218 might also maintain a customer profile data store including information about customers of the merchant system 202, such as their name, address and other contact information, payment information, preferences, and other data.

According to embodiments, the online shopping module 218 also provides functionality for allowing third-party sellers, such as the seller 208, to sell products on the e-commerce marketplace 228. Although only a single seller 208 is illustrated in FIG. 2, it should be appreciated that many such sellers might be permitted to sell products by way of the e-commerce marketplace 228.

In order to facilitate the listing of products for sale on the e-commerce marketplace 228 by sellers, the application servers 204 execute a listing processing module 206 in one embodiment. The listing processing module 206 receives a seller feed 214 from a seller 208 that contains details describing the products the seller 208 wishes to make available for sale through the e-commerce marketplace 228.

The seller feed 214 may be a flat file containing tabular data, an extensible markup language ("XML") file, or any other data container in which product details can be encapsulated. The seller feed 214 may contain data for multiple product listings, each containing a number of fields identifying the product and describing various attributes of the product. The listing processing module 206 may receive the seller feed 214 from a client device 210 over the network 216.

In one embodiment, the seller feed 214 is produced by an inventory loader application 212 executing on the client device 210. The inventory loader application 212 may be configured to integrate with an inventory management system (not shown) operated by the seller 208. It should be appreciated that other mechanisms might be provided to enable a seller 208 to list products for sale on the e-commerce marketplace 228. For example, the listing processing module 206 might provide a Web-based interface through which the seller 208 can create product listings by specifying various attributes of products offered for sale by the seller 208. Other mechanisms might also be utilized.

Based upon data received from the marketplace seller 208, the listing processing module 206 creates product listings in the product catalog 102. As illustrated in FIG. 2, each of the product listings might include a number of attributes 220 having values specified for the corresponding product. In the example shown in FIG. 2, for instance, a product listing has been created in the product catalog 102 that includes an attribute 220A for storing a product identifier, an attribute 220B for storing a product title, an attribute 220C for storing a brand name, an attribute 220D for storing a price for the product, and an attribute 220E for storing an available quantity of the product. It should be appreciated that the attributes 220 shown in FIG. 2 are merely illustrative and that many more attributes might be specified in a product listing. It should also be appreciated that the attributes 220 for each product listing might vary. For example, the products in each product category might have different attributes 220.

As mentioned above, it is possible for multiple product listings to be created in the product catalog 102 that correspond to the same product. For example, different product sellers 208 might submit product listings for the same product that have different product identifiers or descriptions. As a result, the listing processing module 206 might create duplicate product listings for the same product in the product catalog 102. Having multiple product listings for the same product in the product catalog 102 can be confusing to consumers and negatively impact the customer experience provided by the e-commerce marketplace 228.

In order for the merchant that operates the merchant system 202 to understand the extent to which duplicate product listings exist in the product catalog 102, it may be desirable to compute the actual rate of duplication of product listings in the catalog 102. As mentioned above, however, the product catalog 102 might include hundreds of millions of product listings. Determining the actual rate of duplication of product listings in a product catalog 102 having this number of product listings may not be possible or may be prohibitively expensive. It may, however, be less computationally expensive to estimate the duplication rate of product listings in the product catalog 102 or some subset of the product catalog 102, such as within a category of products.

In order to estimate the number of duplicate product listings in the product catalog 102, the application servers 204 are configured to execute an estimated duplication rate computation module 110. As mentioned briefly above, the estimated duplication rate computation module 110 is a software module that is configured to compute the de-biased estimated duplication rate 112 of products in the product catalog 102 or some subset thereof. As also mentioned above, the de-biased estimated duplication rate 112 describes the estimated percentage of duplicate product listings in the product catalog 102, or a subset thereof.

The estimated duplication rate computation module 110 is also configured to compute the de-biased estimated duplication rate 112 in a manner that reduces or eliminates bias introduced during the audit process 106 for identifying duplicate product listings 108 in the product catalog 102. Bias may be introduced because the audit process 106 is not limited to locating duplicate product listings 108 in the sample of product listings 104. Additional details regarding the operation of the estimated duplication rate computation module 110 for computing the de-biased estimated duplication rate 112 will be provided below with regard to FIGS. 3-9.

Figure 3:
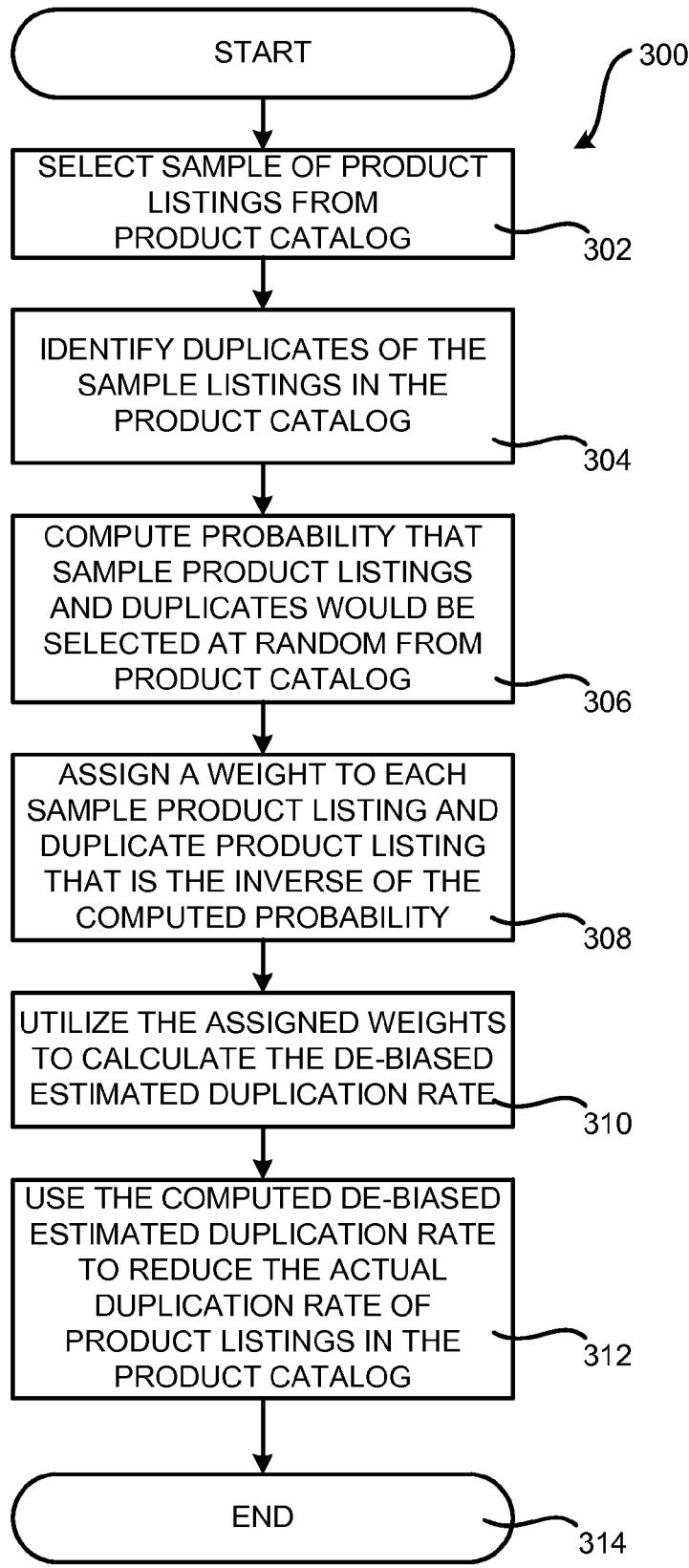
FIG. 3 is a flow diagram showing a routine for computing a de-biased estimated duplication rate according to one embodiment disclosed herein.
Figure 4:
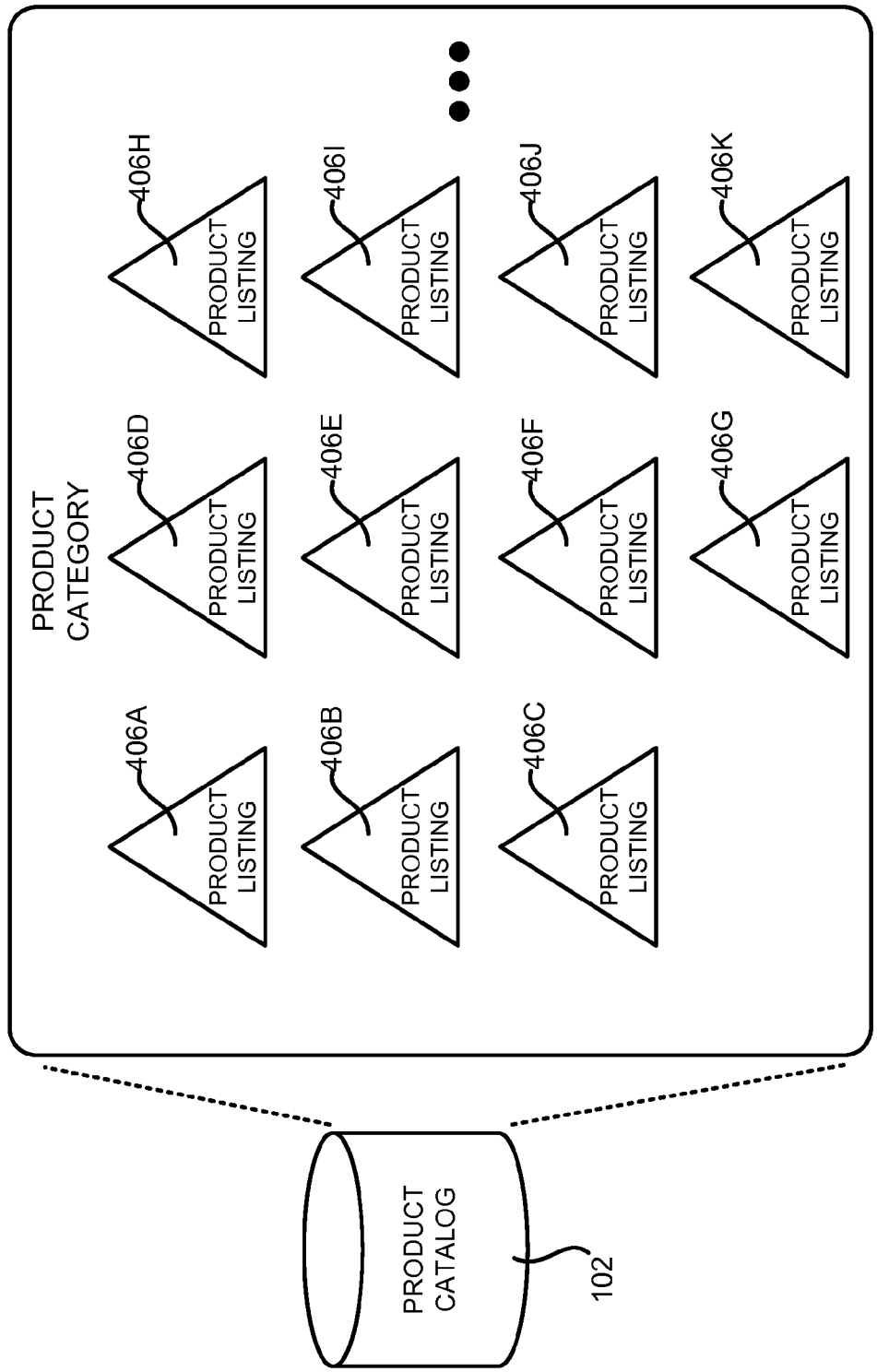
FIGS. 4-7 are data store diagrams showing sample product listings in a product category of a product catalog utilized to compute a de-biased estimated duplication rate in one example disclosed herein.
Figure 5:
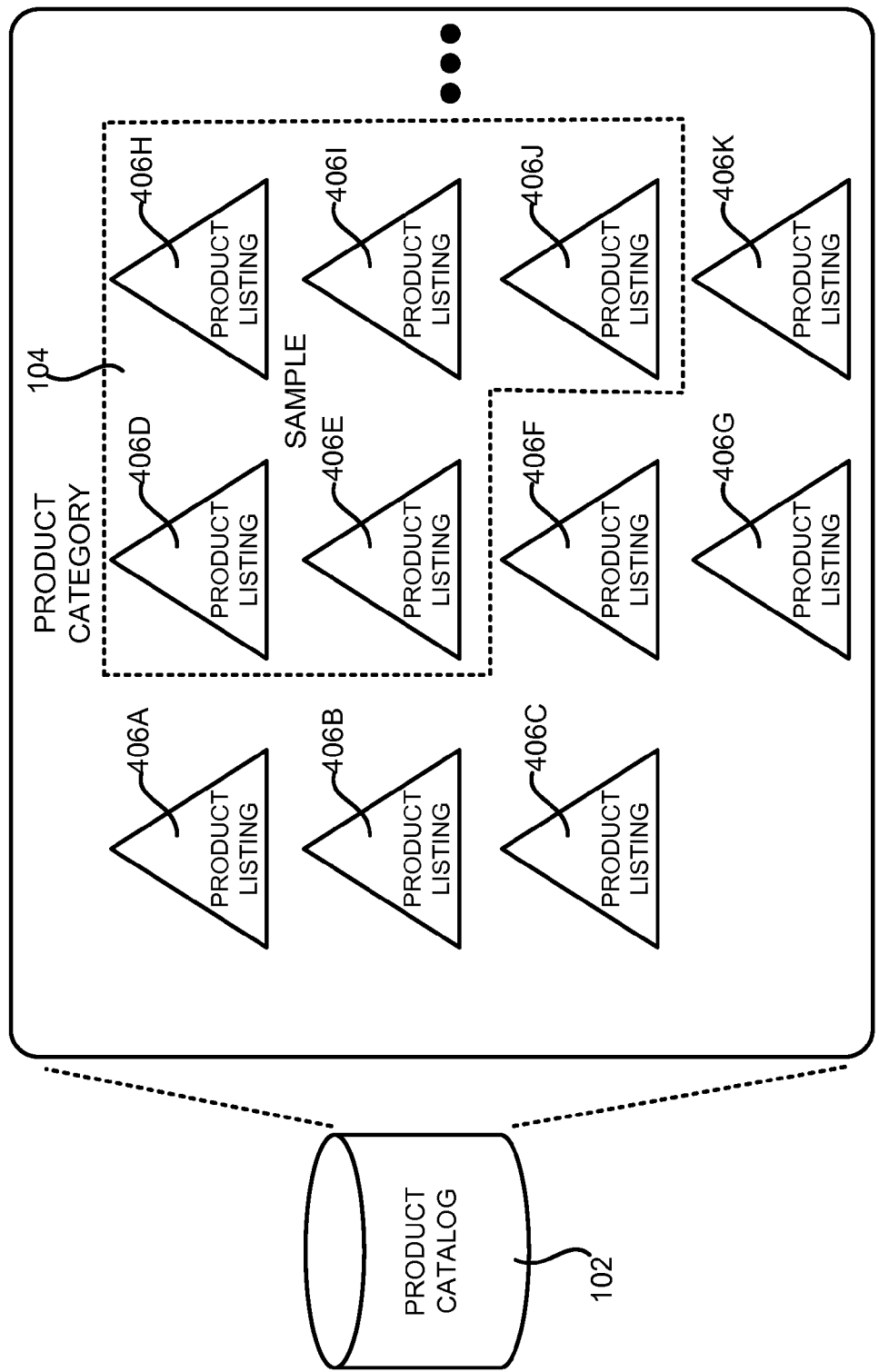

Turning now to FIG. 3, additional details will be provided regarding the embodiments described herein for computing the de-biased estimated duplication rate 112. It should be appreciated that the logical operations described herein with regard to FIG. 3 and the other FIGS. are implemented (1) as a sequence of computer implemented acts or program modules running on a computing system and/or (2) as interconnected machine logic circuits or circuit modules within the computing system. The implementation is a matter of choice dependent on the performance and other requirements of the computing system.

The logical operations described herein with reference to the various FIGS. are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein.

FIG. 3 is a flow diagram showing aspects of one illustrative routine 300 for computing the de-biased estimated duplication rate 112, according to one embodiment disclosed herein. FIG. 3 will be described in conjunction with FIGS. 4-7, which are data store diagrams showing the illustrative contents of one product category contained in the product catalog 102. FIG. 3 will also be described in conjunction with FIG. 8, which is a computation diagram showing one equation for computing the de-biased estimated duplication rate 112 according to one embodiment disclosed herein. It should be appreciated that while the illustrative embodiment shown in FIGS. 4-8 describes computing the de-biased estimated duplication rate 112 for a category of product listings in a product catalog 102, this mechanism might be utilized to compute the de-biased estimated duplication rate 112 for an entire product catalog 102, for other subsets of product listings in a product catalog 102, or for other types of items altogether.

The routine 300 begins at operation 302, where a sample of product listings 104 is taken from the product catalog 102. If the de-biased estimated duplication rate 112 is to be computed for a category of products, then the sample of product listings 104 may be taken from product listings in the product category. The sample of product listings 104 might also be taken from another subset of product listings in the product catalog 102. The sample of product listings 104 might be taken randomly from the product listings in the product catalog 102 or in another manner. The sample of product listings 104 might be taken manually or by the estimated duplication rate computation module 110.

In the example shown in FIGS. 4-7, the de-biased estimated duplication rate 112 is computed for a particular product category of the product catalog 102. For instance, the de-biased estimated duplication rate 112 may be computed for product listings in an electronics category or a textiles category. In this example, the product category includes a large number of product listings 406. For example, the product category might include one million or more product listings 406. However, only eleven product listings 406A-406K are shown in the product category in FIGS. 4-7 for illustrative purposes. The example product category may include many more product listings 406 than illustrated.

In the example shown in FIGS. 4-7, a sample of product listings 104 has been taken that includes five product listings 406: the product listings 406D, 406E, 406H, 406I, and 406J. It should be appreciated, however, that this sample is merely illustrative and that a sample of product listings 104 might include more or fewer product listings 406. As also mentioned above, the sample of product listings 104 might be taken randomly or in another manner and might be taken manually or in an automated fashion. The sample of product listings 104 might also be selected in another manner.

As mentioned briefly above, the population from which the sample of product listings 104 is taken may be restricted based upon one or more factors in some embodiments. For instance, the population might be restricted based upon whether product listings 406 are visible or the number of search impressions the product listings 406 have received. As an example, product listings 406 that have not been searched may not be included in the population from which the sample of product listings 104 is taken. In this way, product listings 406 that are not commonly searched or viewed may not be factored into the estimated duplication rate. The population from which the sample of product listings 406 is taken might also be restricted based upon other factors.

Once the sample of product listings 104 has been made, the routine 300 proceeds from operation 302 to operation 304. At operation 304, product listings 406 that are duplicates of the product listings 406D, 406E, 406H, 406I, and 406J in the sample of product listings 104 are identified. In order to identify the duplicate product listings, a search of the relevant portion of the product catalog 102 might be made for product listings 406 that are duplicates of the product listings in the sample of product listings 104.

In the example shown in FIGS. 4-7, for instance, a search is made of the product listings in the product catalog for product listings 406 that are duplicates of the product listings 406D, 406E, 406H, 406I, and 406J in the sample of product listings 104. This search may be made manually, such as by human auditors, in an automated fashion by the estimated duplication rate computation module 110, or by another software component or system within the merchant system 202. The identification of duplicate product listings 406 might also be performed in other ways.

Figure 6:
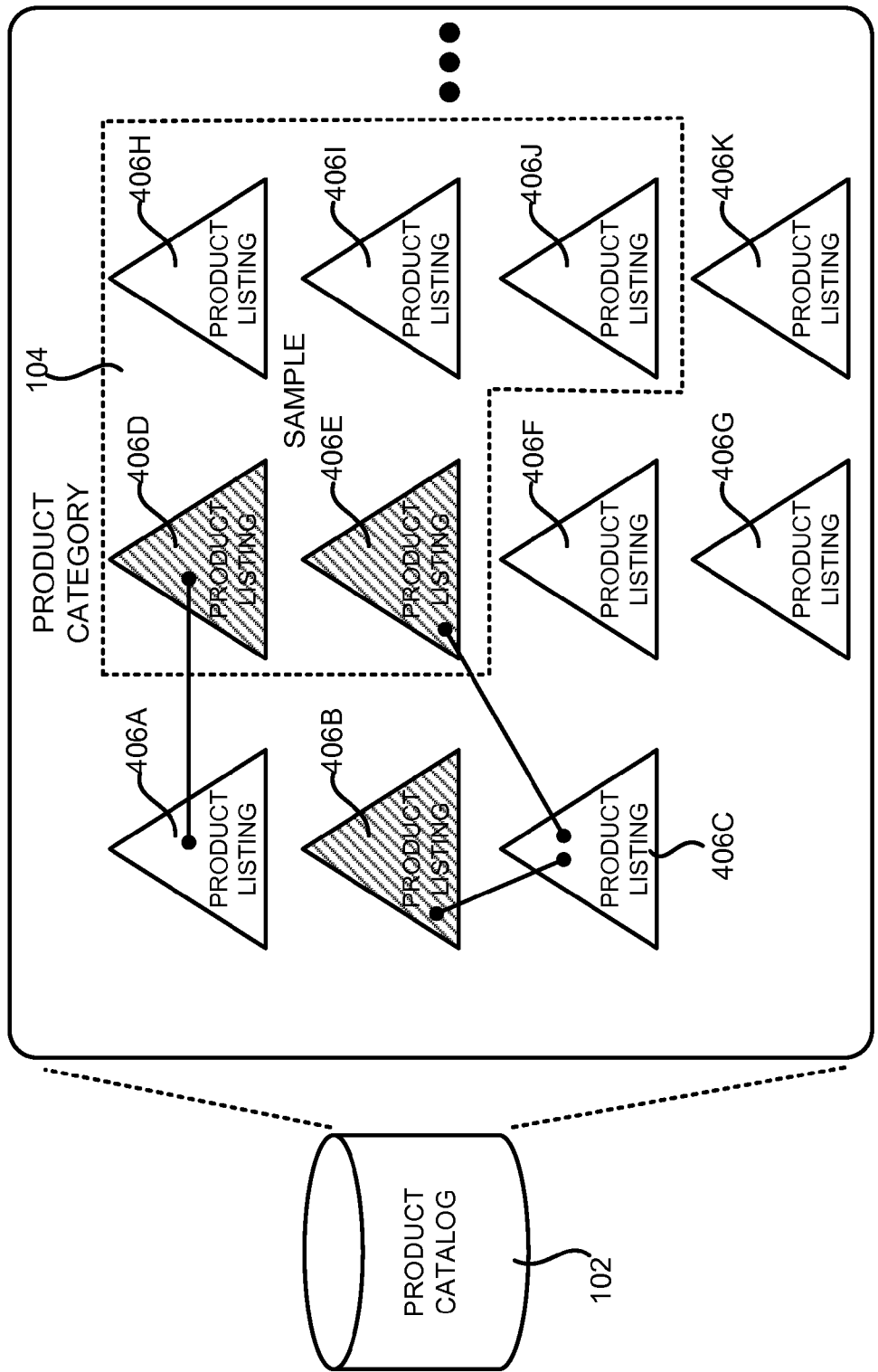

In the example shown in FIG. 6, several duplicate product listings 406 have been identified. In particular, the product listing 406D is a duplicate of the product listing 406A. The product listing 406E is a duplicate of the product listing 406C. The product listing 406B is also a duplicate of the product listing 406C. Accordingly, three duplicate product listings 108 have been identified for the product listings 406D, 406E, 406H, 406I, and 406J in the sample of product listings 104 in this example.

Once the duplicate product listings 108 have been identified, the routine 300 proceeds from operation 304 to operation 306. At operation 306, a probability is computed for each of the product listings 406 in the sample of product listings 104 and the duplicate product listings 108. The computed probability is the probability that the product listings 406 would be included in a randomly selected sample of product listings 104.

Figure 7:
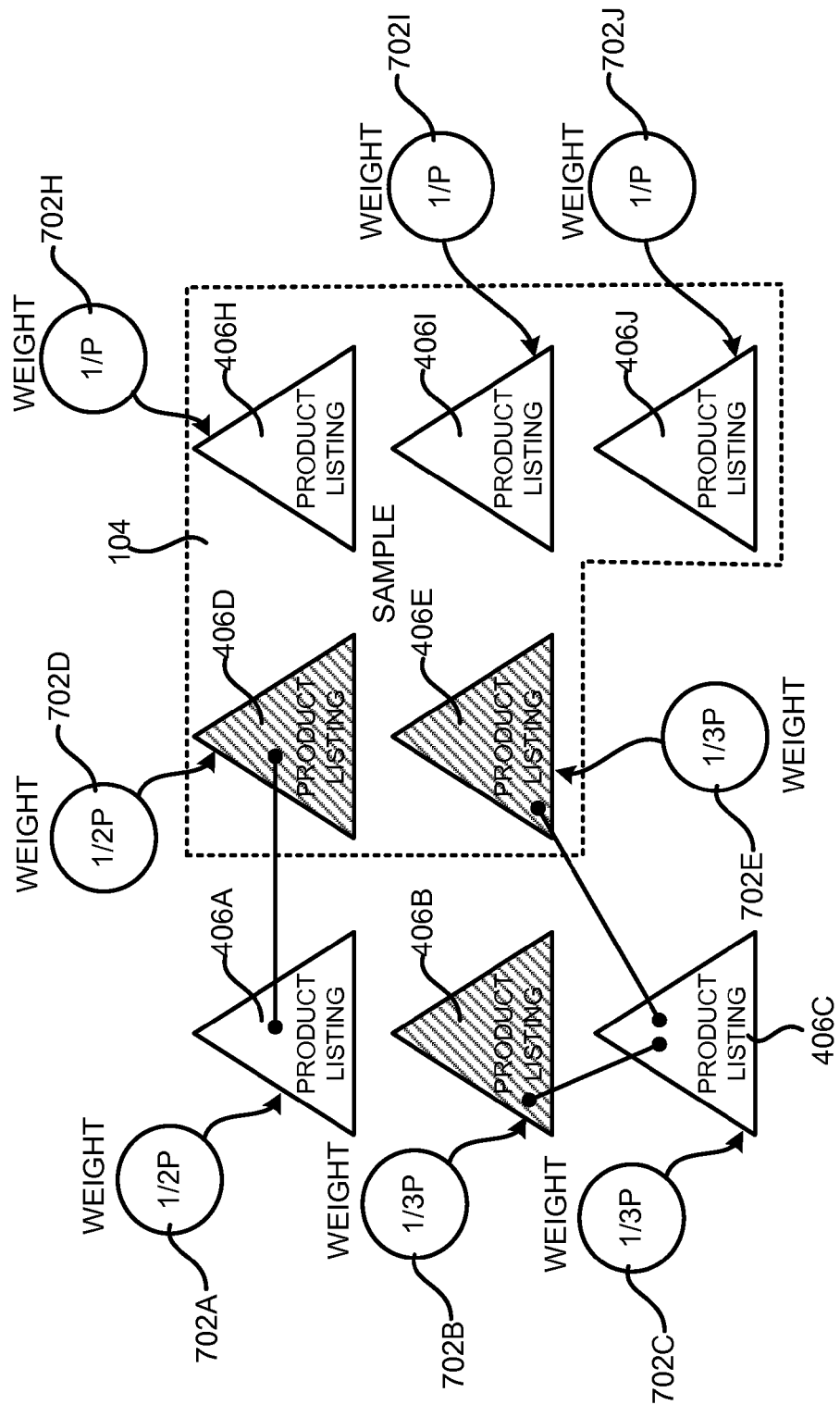

The computed probability may be based upon the number of duplicate product listings 108 found for each product listing 406. For instance, if no duplicate product listings are found for a product listing in the sample of product listings 104, its probability is computed as P, where P is a constant measuring the probability of sampling. As shown in FIG. 7, for instance, the probabilities for the product listings 406H, 406I, and 406J have been computed as P since no duplicate product listings 108 were identified for these product listings.

In the example shown in FIG. 7, the probabilities for the product listings 406A and 406D have been computed as 2P since two duplicate product listings 108 were identified for these product listings. Similarly, the probabilities for the product listings 406B, 406C, and 406E have been computed as 3P since three duplicate product listings 108 were identified for these product listings. Other probabilities may be computed in a similar manner for other product listings 406 having other quantities of duplicate product listings 108.

From operation 306, the routine 300 proceeds to operation 308, where a weight 702 is assigned to each of the listings in the sample of product listings 104 and the duplicate product listings 108. In one embodiment, for instance, the assigned weight 702 is inversely proportional to the probability computed at operation 306 for each listing. For instance, as shown in FIG. 7, a weight 702H, 702I, and 702J of 1/P has been assigned to the product listings 406H, 406I, and 406J. Similarly, a weight 702A and 702D of ½P has been assigned to the product listings 406A and 406D. A weight 702B, 702C, and 702E of ⅓P has been assigned to the product listings 406B, 406C, and 406E.

After the weights 702 have been assigned to the product listings 406A-406J, the routine 300 proceeds to operation 310 where the assigned weights 702 are utilized to compute the de-biased estimated duplication rate 112 of product listings in the product category of the product catalog 102. The de-biased estimated duplication rate 112 may be computed as a sum of the weights 702 assigned to the duplicate product listings 108 divided by the sum of the weights 702 assigned to the product listings 406 in the sample of product listings 104 and the weights 702 assigned to the duplicate product listings 108.

Figure 8:
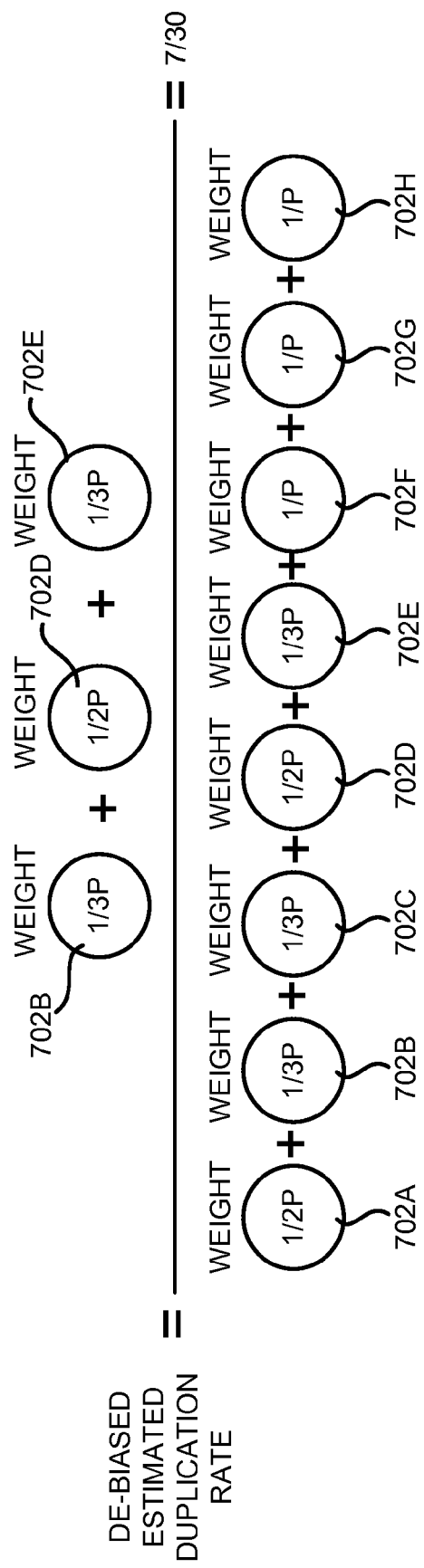
FIG. 8 is a computation diagram showing one equation for computing a de-biased estimated duplication rate according to one embodiment disclosed herein.

As shown in FIG. 8, for instance, the de-biased estimated duplication rate 112 for the example shown in FIGS. 4-7 is computed by summing the weights 702B, 702D, and 702E of the duplicate product listings 406B, 406D, and 406E in this example. The weights 702 of the product listings 406D, 406E, 406H, 406I, and 406J in the sample of product listings 104 and the weights 702B, 702D, and 702E of the duplicate product listings 406B, 406D, and 406E are also summed. The weights assigned to the duplicate product listings 108 are then divided by a sum of the weights 702 assigned to the product listings 406 in the sample of product listings 104 and the weights 702 assigned to the duplicate product listings 108 in order to compute the de-biased estimated duplicate rate 112. In this example, the de-biased estimated duplicate rate 112 is 7/30 (2.333%).

Once the de-biased estimated duplication rate 112 has been computed, the routine 300 proceeds from operation 310 to operation 312. At operation 312, the de-biased estimated duplication rate 112 may be utilized to reduce an actual rate of duplication of product listings 406 in the product catalog 102.

For example, and as briefly mentioned above, the computed de-biased estimated duplication rate 112 may be utilized to modify a clustering process that merges different product listings 406 for the same product. The computed de-biased estimated duplication rate 112 might also be utilized to modify the manner in which the listing processing module 206 processes seller feeds 214 containing product listings 406. The computed de-biased estimated duplication rate 112 might also be utilized in other ways in an attempt to reduce the actual rate of duplication of product listings 406 within the product catalog 102. From operation 312, the routine 300 proceeds to operation 314, where it ends.

As mentioned briefly above, although the embodiments and examples presented herein are primarily presented in the context of a merchant system 202 that embodies the concepts disclosed herein for computing a de-biased estimated duplication rate 112 for product listings 406, the disclosure presented herein is not limited to such an implementation. For example, while the embodiments disclosed herein are described primarily in the context of computing a de-biased estimated duplication rate 112 for product listings 406 stored in a product catalog 102, the mechanisms disclosed herein might be utilized to compute a de-biased estimated duplication rate 112 for other types of items grouped in other types of data sets.

Figure 9:
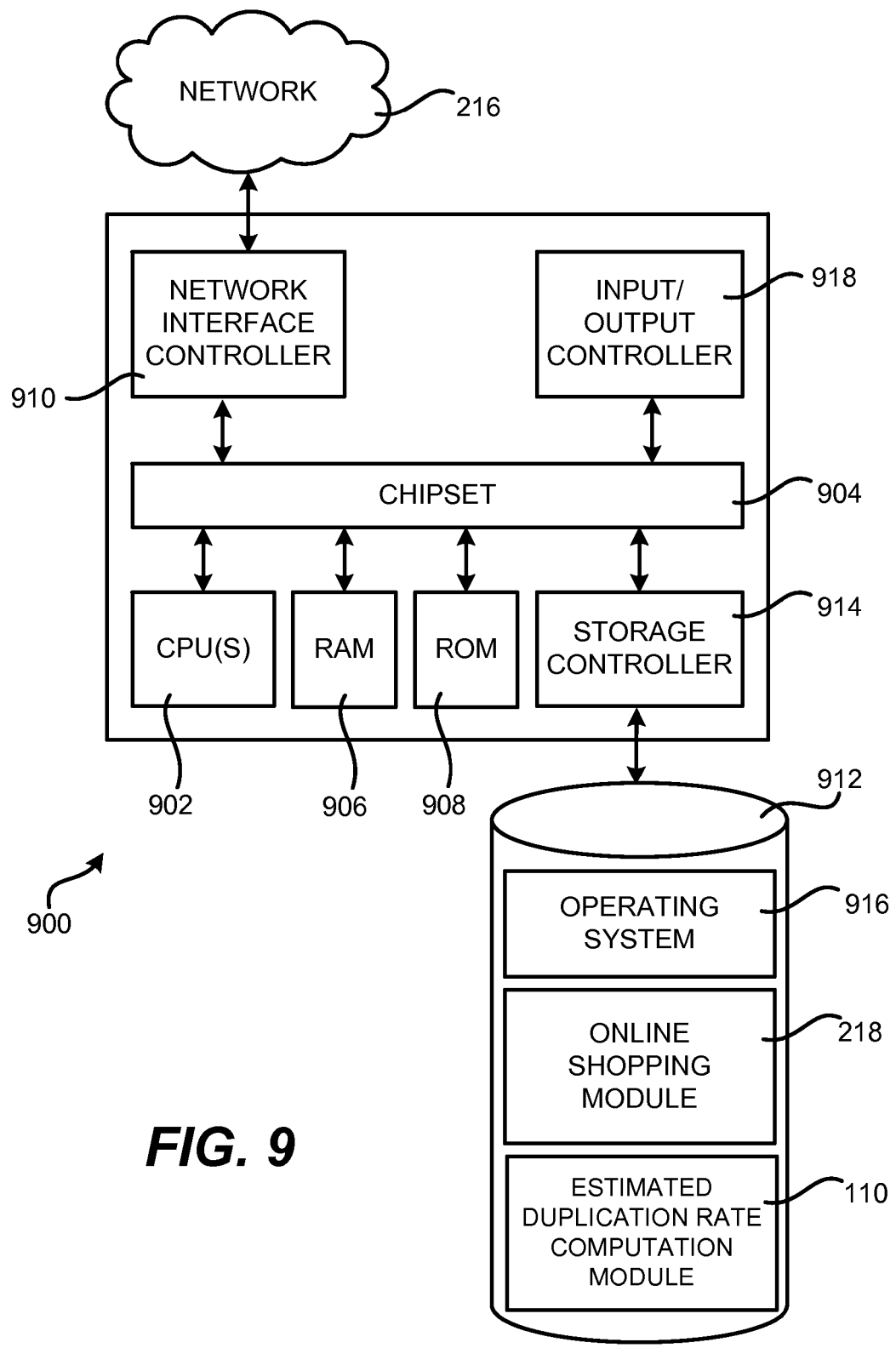
FIG. 9 is a computer architecture diagram showing one illustrative computer hardware architecture for use in computing devices configured to implement the concepts and technologies disclosed herein in one embodiment.

FIG. 9 shows an example computer architecture for a computer 900 capable of executing the software components described herein for computing a de-biased estimated duplication rate 112 in the manner presented above. The computer 900 shown in FIG. 9 illustrates a conventional server computer, workstation, desktop computer, laptop, PDA, electronic book reader, digital wireless phone, tablet computer, network appliance, set-top box, or other computing device, and may be utilized to execute any aspects of the software components presented herein described as executing on the merchant system 202, the client devices 210 and 226, or on any other computing system described herein.

The computer 900 includes a baseboard, or "motherboard," which is a printed circuit board to which a multitude of components or devices may be connected by way of a system bus or other electrical communication paths. In one illustrative embodiment, one or more central processing units ("CPUs") 902 operate in conjunction with a chipset 904. The CPUs 902 are standard programmable processors that perform arithmetic and logical operations necessary for the operation of the computer 900.

The CPUs 902 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 904 provides an interface between the CPUs 902 and the remainder of the components and devices on the baseboard. The chipset 904 may provide an interface to a random access memory ("RAM") 906, used as the main memory in the computer 900. The chipset 904 may further provide an interface to a computer-readable storage medium such as a read-only memory ("ROM") 908 or non-volatile RAM ("NVRAM") for storing basic routines that that help to startup the computer 900 and to transfer information between the various components and devices. The ROM 908 or NVRAM may also store other software components necessary for the operation of the computer 900 in accordance with the embodiments described herein.

According to various embodiments, the computer 900 may operate in a networked environment using logical connections to remote computing devices and computer systems through a network, such as a local-area network ("LAN"), a wide-area network ("WAN"), the Internet, or any other networking topology known in the art that connects the computer 900 to remote computers. The chipset 904 includes functionality for providing network connectivity through a network interface controller ("NIC") 910, such as a gigabit Ethernet adapter.

For example, the NIC 910 may be capable of connecting the computer 900 to other computing devices, such as the application servers 204, the client devices 210 and 226, a data storage system in the merchant system 202, and the like, over the network 216 described above in regard to FIG. 2. It should be appreciated that multiple NICs 910 may be present in the computer 900, connecting the computer to other types of networks and remote computer systems.

The computer 900 may be connected to a mass storage device 912 that provides non-volatile storage for the computer. The mass storage device 912 may store system programs, application programs, other program modules, and data, which have been described in greater detail herein. The mass storage device 912 may be connected to the computer 900 through a storage controller 914 connected to the chipset 904. The mass storage device 912 may consist of one or more physical storage units. The storage controller 914 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computer 900 may store data on the mass storage device 912 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 912 is characterized as primary or secondary storage, or the like.

For example, the computer 900 may store information to the mass storage device 912 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 912 by detecting the physical states or characteristics of one or more particular locations within the physical storage units.

In addition to the mass storage device 912 described above, the computer 900 might have access to other computer-readable media to store and retrieve information, such as program modules, data structures, or other data. It should be appreciated by those skilled in the art that computer-readable media can be any available media that may be accessed by the computer 900, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 912 may store an operating system 916 utilized to control the operation of the computer 900. According to one embodiment, the operating system comprises the LINUX operating system. According to another embodiment, the operating system comprises the WINDOWS® SERVER operating system from MICROSOFT Corporation of Redmond, Wash. According to further embodiments, the operating system may comprise the UNIX or SOLARIS operating systems. It should be appreciated that other operating systems may also be utilized. The mass storage device 912 may store other system or application programs and data utilized by the computer 900. For instance, when utilized to implement the client device 226, the mass storage device 912 may store the client application 224. When utilized to implement the client device 210, the mass storage device 912 may store the inventory loader application 212. When utilized to implement one or more of the application servers 204, the mass storage device 912 may store the online shopping module 218, estimated duplication rate computation module 110, and potentially other modules and data.

In one embodiment, the mass storage device 912 or other computer-readable storage media may be encoded with computer-executable instructions that, when loaded into the computer 900, transform the computer from a general-purpose computing system into a special-purpose computer capable of implementing the embodiments described herein. These computer-executable instructions transform the computer 900 by specifying how the CPUs 902 transition between states, as described above. According to one embodiment, the computer 900 has access to computer-readable storage media storing computer-executable instructions that, when executed by the computer 900, perform the various routines and operations described herein.

The computer 900 may also include an input/output controller 918 for receiving and processing input from a number of input devices, such as a keyboard, a mouse, a touchpad, a touch screen, an electronic stylus, or other type of input device. Similarly, the input/output controller 918 or another controller may provide output to a display device, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for computing a de-biased estimated duplication rate 112 have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for computing an estimated duplication rate of product listings in a product catalog, comprising:

selecting a sample of product listings in a product category of the product catalog;

identifying one or more product listings in the product category that are duplicates of product listings in the sample of product listings;

computing a probability for at least a portion of the product listings in the sample and the duplicate product listings that the product listings would be included in a randomly selected sample of product listings in the product category;

assigning a weight to the at least a portion of the product listings in the sample and to the duplicate product listings, the assigned weights being selected to reduce bias introduced by a location of duplicate product listings outside the sample of product listings, wherein the assigned weight for the at least portion of the product listings is inversely proportional to the computed probability for the at least a portion of the product listings;

utilizing the weights assigned to the product listings in the sample and to the duplicate product listings to compute the estimated duplication rate of product listings in the product category, wherein the estimated duplication rate is based, at least in part, on dividing the weights assigned to the duplicate product listings by the weights assigned to the product listings in the sample and the weights assigned to the duplicate product listings; and utilizing the estimated duplication rate to reduce an actual rate of duplication of product listings in the product category of the product catalog.

2. The computer-implemented method of claim 1, wherein the estimated duplication rate is computed as a sum of the weights assigned to the duplicate product listings divided by a sum of the weights assigned to the product listings in the sample and the weights assigned to the duplicate product listings.

3. The computer-implemented method of claim 2, wherein identifying one or more product listings in the product category that are duplicates of product listings in the sample of product listings comprises, for the at least the portion of the product listings in the sample, searching the product listings in the product catalog for one or more duplicate product listings.

4. A non-transitory computer-readable storage medium having computer-executable instructions stored thereupon which, when executed by the computer, cause the computer to:

sample a product catalog to select a sample of product listings;

search the product catalog for other product listings that are related to the product listings in the sample;

utilize the related product listings to compute a probability that the product listings in the sample and the related product listings would be included in a sampling of product listings from the product catalog, wherein the probability that the product listings in the sample and the related product listings would be included in a sampling of product listings from the product catalog is computed at least in part based upon the number of related product listings found;

calculate a weight for at least the portion of the product listings and the related product listings based upon the computed probabilities to reduce bias introduced by a location of related product listings outside the sample of product listings, wherein the calculated weight for the at least the portion of the product listings is inversely proportional to the computed probability for the product listings;

compute an estimated duplication rate of product listings in the product catalog utilizing the calculated weights, wherein the estimated duplication rate is based, at least in part, on dividing the weights for the at least the portion of the product listings by the weights assigned to the related product listings in the sample and the weights assigned to the duplicate product listings; and utilize the estimated duplication rate to reduce an actual rate of duplication of product listings in a product category of the product catalog.

5. The non-transitory computer-readable storage medium of claim 4, wherein the sample of product listings is taken from product listings in the product category of the product catalog.

6. The non-transitory computer-readable storage medium of claim 5, wherein the product listings in the product catalog are searched for other product listings that are duplicates of the product listings in the sample.

7. The non-transitory computer-readable storage medium of claim 4, wherein the estimated duplication rate is computed as a sum of the weights calculated for the related product listings divided by a sum of the weights assigned to the product listings in the sample and the weights assigned to the related product listings.

8. An apparatus for computing an estimated duplication rate, the apparatus comprising:

at least one processor; and a computer-readable storage medium having computer-executable instructions stored thereon which, when executed on the at least one processor, cause the apparatus to take a sample of items from a data set, identify other items in the data set that are related to the items in the sample, compute a probability for at least the portion of the items in the sample and the related items that the items would be included in a sampling of items from the data set, compute a weight for at least the portion of the items in the sample and the related items based upon the probability computed for the at least the portion of the items, wherein the weights are computed to reduce bias introduced by a location of related items outside the sample of items, wherein the computed weights for at least one item is inversely proportional to the computed probability for the at least one item, compute an estimated duplication rate of items in the data set utilizing the computed weights, wherein the estimated duplication rate is based, at least in part, on dividing the weights for the at least the portion of the items in the sample by the weights for the related items and the weights assigned to the duplicate product listings; and utilize the estimated duplication rate to reduce an actual rate of duplication of items in the data set.

9. The apparatus of claim 8, wherein the data set comprises product listings in a product catalog.

10. The apparatus of claim 8, wherein the data set comprises product listings in a product category of a product catalog.

11. The apparatus of claim 10, wherein the other items in the data set that are related to the items in the sample are identified by searching the product listings in the product catalog for other product listings that are related to product listings in the sample.

12. The apparatus of claim 8, wherein the items that are related to the items in the sample are duplicates of items in the sample of items.

13. The apparatus of claim 8, wherein the probability that the items in the sample and the related items would be included in a sampling of items from the data set is computed at least in part based upon the number of related items identified in the data set.

14. The apparatus of claim 8, wherein the estimated duplication rate is computed as a sum of the weights calculated for the related items divided by a sum of the weights assigned to the items in the sample and the weights assigned to the related items.

15. The apparatus of claim 14, wherein the data set from which the sample of items is taken is restricted based upon at least one factor.

16. The apparatus of claim 15, wherein the data set from which the sample of items is taken is restricted based upon a number of search impressions received by at least one item in the data set.

* * * * *